United States Patent [19]

Klie et al.

[11] Patent Number: 4,826,226

[45] Date of Patent: May 2, 1989

[54] BUMPER FOR A MOTOR VEHICLE

[75] Inventors: Wolfgang Klie, Korntal; Wolfgang Fischer, Leinfelden-Echterdingen; Johann Tomforde, Sindelfingen; Horst Kleiner, Stuttgart; Gunther Ellenrieder, Esslingen, all of Fed. Rep. of Germany

[73] Assignee: Daimler-Benz Aktiengesellschaft, Fed. Rep. of Germany

[21] Appl. No.: 118,051

[22] Filed: Nov. 9, 1987

[30] Foreign Application Priority Data

Nov. 15, 1986 [DE] Fed. Rep. of Germany ....... 3639195

[51] Int. Cl.[4] .............................................. B60R 19/08
[52] U.S. Cl. ..................................... 293/120; 293/136
[58] Field of Search ................ 293/120, 132, 136, 155

[56] References Cited

U.S. PATENT DOCUMENTS 4,474,395 10/1984 Horloff et al. ...................... 293/120
4,482,180 11/1984 Huber et al. ....................... 293/120
4,586,739 5/1986 Loren et al. ....................... 293/120

FOREIGN PATENT DOCUMENTS 3325104 1/1986 Fed. Rep. of Germany .

Primary Examiner—Robert R. Song
Attorney, Agent, or Firm—Barnes & Thornburg

[57] ABSTRACT

A bumper for a motor vehicle with a support part which, supports and separates an impact-near and an impact-remote layer of energy-absorbing form. The supporting part is held by resilient holders on a support fixed to the vehicle. A panelling covers the impact-near layer towards the front and is fixed to the support part. A skirt adjoins toward the bottom. In order to increase the absorbency and retain a pedestrain-protective configuration, the support part is designed as a stiff load distributing support and the panelling is fastened to it and merges integrally with the skirt.

17 Claims, 3 Drawing Sheets

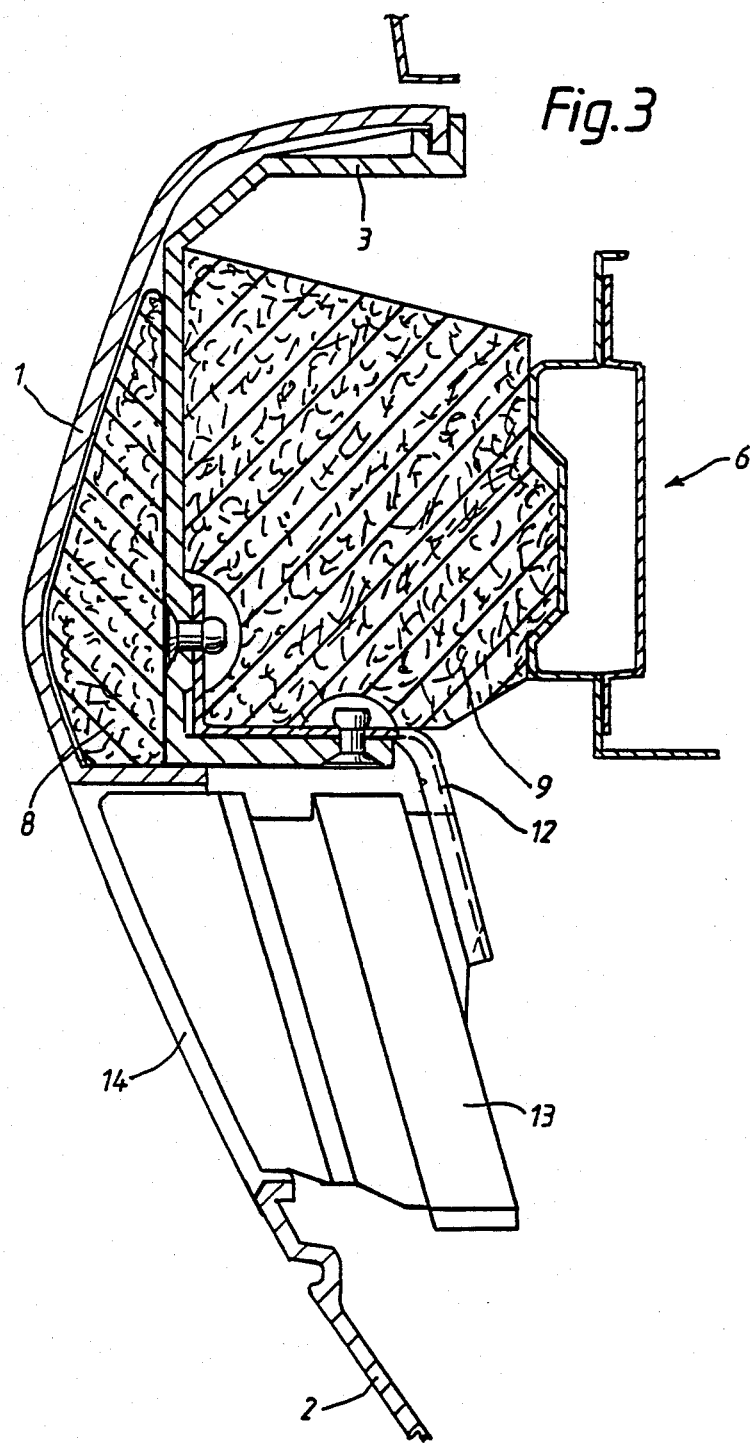

BUMPER FOR A MOTOR VEHICLE

BACKGROUND OF THE INVENTION

The invention relates to a bumper for a motor vehicle with a support part supporting energy absorbing foam layers via resilient holders on a fixed vehicle support. A panelling covering the impact-near foam layer towards the front is fixed to the support and adjoins a skirt toward the bottom.

German published unexamined patent application (DOS) No. 3,325,104 discloses a bumper. In this case the support extends above and below the foam layer as a covering and skirt respectively, and these continuations have to yield resiliently when impacted, e.g., by an obstacle. Accordingly close limits are set for the support strength. Therefore, in the case of a relatively high, locally confined impact effect, a local overloading of the bumper system may occur, with the result that components which can no longer be regenerated have to be exchanged.

It is an object of the invention to increase decisively the regenerateable impact absorbency of the bumper, while retaining the pedestrain-protective flexible design of the cover and of the skirt.

This object is achieved by designing the support part as a stiff load distributing member with the panelling fastened to it to merge integrally with the skirt. Owing to the fact that the support part now no longer undertakes any panelling function, it supporting capacity can be easily adapted to the requirements by corresponding material selection and dimensioning. Due to the detachment in terms of force of the cover panelling and the skirt from the support part, there is also freedom with respect to defining the characteristics for the obtainment of pedestrain-protective deign of the front bumper finish.

In a further development of preferred embodiments of the invention, rigid attachments are fixed on the support part, which serve for example the purpose of receiving fog lamps in a protective arrangement.

In order to achieve an adaptation of the cross section elasticity modulus to the stresses to be expected and thus an increase in the load bearing strength, the support part is provided with a reinforcement in the region between the front holders in especially preferred embodiments.

Relative movements between the two foam layers and the assigned supporting walls are prevented in all possible directions of impact by providing that the support part or the support part and the reinforcement accommodate the two layers of energy-absorbing foam securely against displacements.

Other objects, advantages and novel features of the present invention will become apparent from the following detailed description of the invention when considered in conjunction with the accompanying drawings.

BRIEF DESCRIPTION OF THE DRAWING

FIG. 3 shows the section along the Line III—III in FIG. 1.

DETAILED DESCRIPTION OF THE DRAWING

Figure 1:
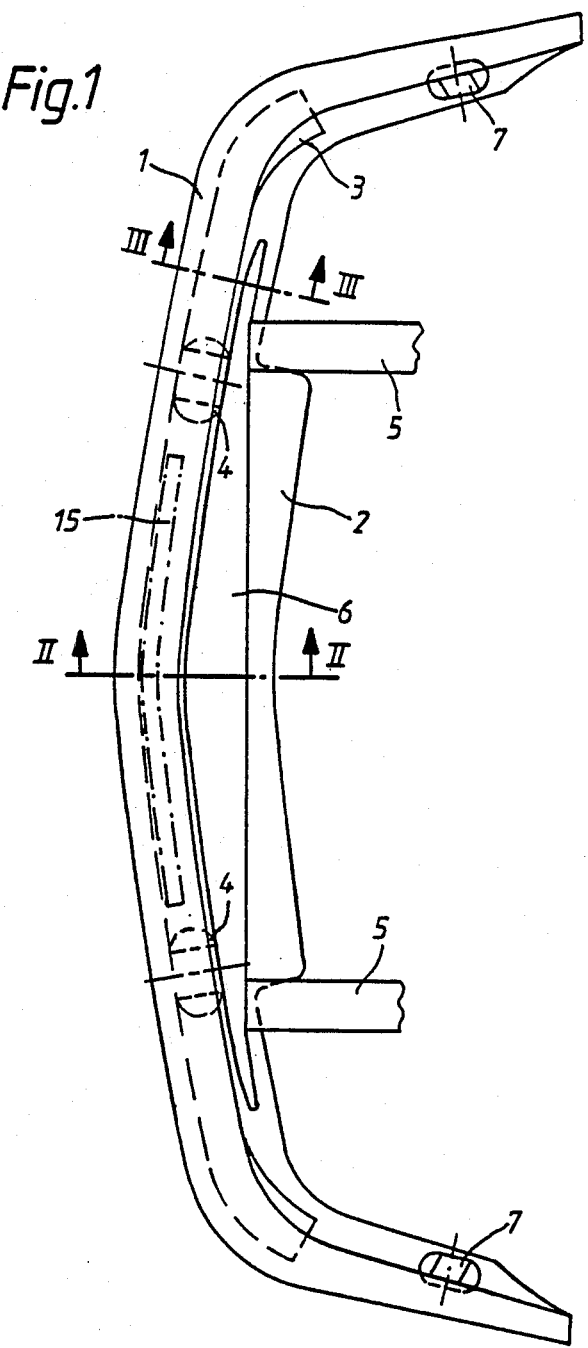
FIG. 1 is a simplified schematic plan view of a front bumper arrangement constructed in accordance with a preferred embodiment of the invention.

A bumper illustrated in FIG. 1 includes of a laterally wrapped-around panelling 1 of a viscoplastic material, which merges with a skirt 2 towards the bottom. The panelling 1 is fixed in a way described later to a substantially flexurely stiff support part 3 which is supported by means of front flexibly compliant holders 4 on a support 6 fixed to the vehicle and connected to the two front chassis members 5. These flexible compliant holders 4 can be of any conventional construction providing for a flexible connection of the relative stiff part 3 to the support 6. One example of such a flexible compliant holder is fund at FIG. 3 of said German patent application No. (DOS) 3,325,104 wherein an oval shaped curved spring is boltingly connected to both the stiff part, separating the two regenerative foamed layers, and the support. In that construction a foamed insert is located within the oval spring. Likewise flexible compliant hoders 7 hold the wrapped-around end regions of the panelling 1 at a distance from mudguards which are not shown.

Figure 2:
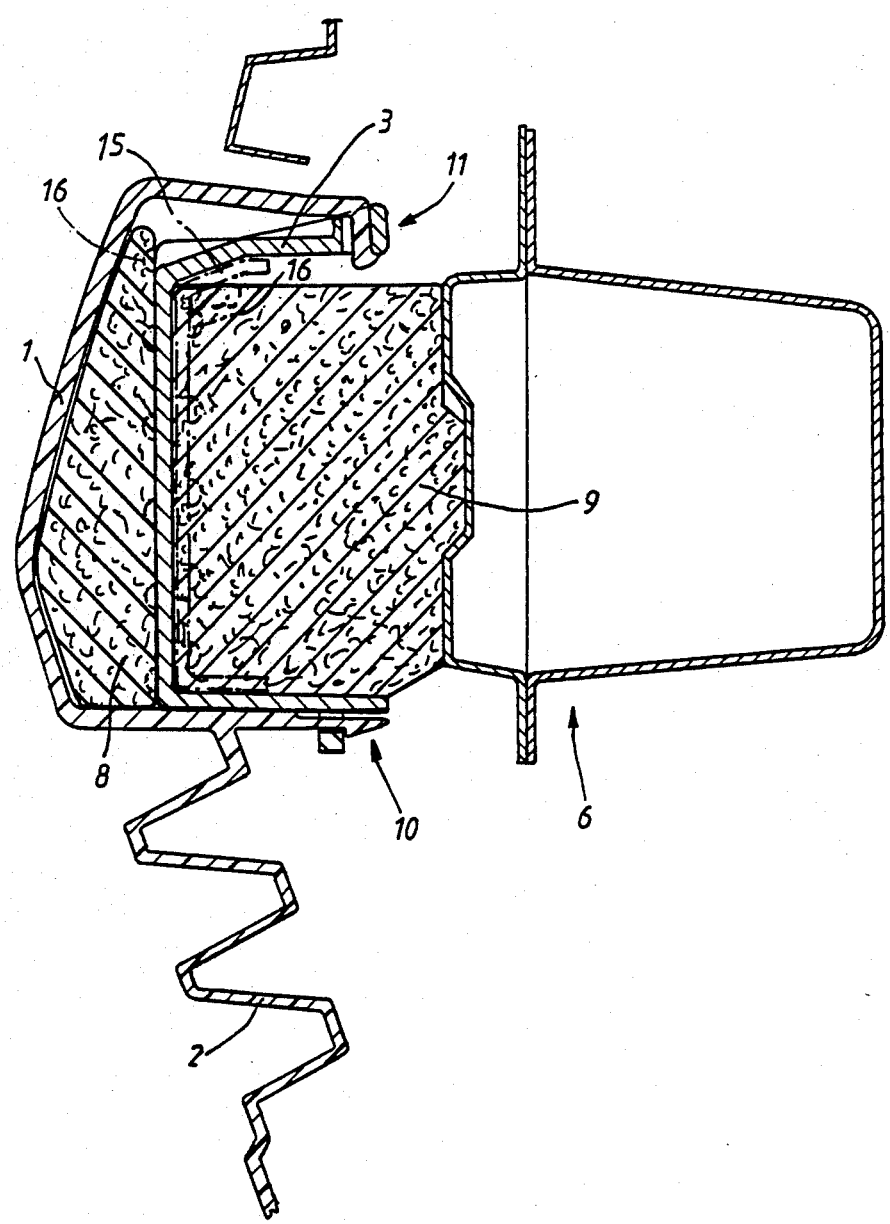
FIG. 2 is a sectional schematic view taken along the Line II—II in FIG. 1.

As FIG. 2 and 3 show, the enclosed space between the panelling 1 and the support part 3 is lined as far as possible with a first layer 8 of energy-absorbing foam. A second layer 9, likewise of energy-absorbing foam, is located behind the holder 4 in longitudinal vehicle direction and provides a two-dimensional support for the part 3 against the support 6 by virtue of its stiffness as defined by its cross-section elasticity modulus, which foam thus provides support both in a horizontal (longitudinally of the vehicle) and vertical (heightwise of the vehicle) direction.

The connection of the panelling 1 with the support part 3 is peformed according to FIG. 2 by means of lower clip connections 10 and upper clip connections 11, which are arranged at regular intervals along the length over which the support part 3 extends.

According to FIG. 3, rigid attachments 12, such as holders of additional lamps 13, may be fastened to the support part 3, the skirt 2 being provided with a clearance 14 at the assigned place in each case for light to pass through.

As indicated by do-dashed lines in FIG. 1 and 2, in order to increase the cross-section modulus of the support part 3 in the region between the two holders 4, which is particularly stressed in a substantially central collision, a reinforcement 15 positively connected to said support part is fitted in addition.

It further emerges from FIG. 2 that brackets 16 are provided on the support part 3 and on the reinforcement 15 for supporting the first layer 8 and the second layer 9 securely against displacement on the support part 3 and on the reinforcement 15, respectively. These brackets 16 may be moulded out or fixed on. In a way not shown, it is also contemplated in certain embodiments to fix the layers 8 and 9 adhesively on the support part 3 and on the reinforcement 15 for supporting securely against displacement.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A bumper for a vehicle comprising:

a stiff load distributing support part fixed to a fixed vehicle structure via resilient holding means, an impact-near layer of energy absorbing form supported at one side of the support part, an impact remote layer of energy absorbing foam supported at another side of the support part opposite said one side, and a panelling covering said impact-near layer said panelling having portions separated from and other portions fastened to the support part.

2. A bumper in accordance with claim 1, wherein, said panelling covering faces outwardly and forwardly from said vehicle with respect to a normal driving position of the vehicle to form a pedestrian-protection design, and wherein said panelling merges integrally with a downwardly extending vehicle skirt.

3. A bumper in accordance with claim 1, wherein rigid attachment means for light fixtures are fixed on the support part.

4. A bumper in accordance with claim 1, wherein the resilient holding means includes a pair of laterally spaced resilient holding means, and wherein the support part is provided with reinforcement means in the lateral spaced region between said resilient holding means.

5. A bumper in accordance with claim 2, wherein the resilient holding means includes a pair of laterally spaced resilient holding means, and wherein the support part is provided with reinforcement means in the lateral spaced region between said resilient holding means.

6. A bumper in accordance with claim 1, wherein both said layers of energy absorbing foam are secured against displacement with respect to the support part.

7. A bumper in accordance with claim 4, wherein both said layers energy absorbing foam are secured against displacement with respect to the reinforcement means and the support part.

8. A bumper in accordance with claim 7, wherein both said layers of energy absorbing foam are secured by brackets on the support part and the reinforcement means.

9. A bumper in accordance with claim 7, wherein both said layers of energy absorbing foam are secured by adhesive on the support part and the reinforcement means.

10. A bumper in accordance with claim 1, wherein there are cooperating fastening means on said support part and said panelling covering for attaching said other portions, comprising inter-digitating clip and clip holding elements.

11. A bumper in accordance with claim 10, wherein there are a plurality of clips and clip holding elements spaced along the width of the vehicle.

12. A bumper in accordance with claim 10, wherein the clip elements each have a lip portion that engages with one of the clip holding elements and wherein each of the clip holding elements are an aperture.

13. A bumper in accordance with claim 11, wherein the clip elements each have a lip portion that engages with one of the clip holding elements and wherein each of the clip holding elements are an aperture.

14. A bumper in accordance with claim 10, wherein the clip elements are located on the panelling covering and the apertures are located on the support part.

15. A bumper in accordance with claim 11, wherein the clip elements are located on the panelling covering and the apertures are located on the support part.

16. A bumper in accordance with claim 12, wherein the clip elements are located on the panelling covering and the apertures are located on the support part.

17. A bumper in accordance with claim 13, wherein the clip elements are located on the panelling covering and the apertures are located on the support part.

* * * * *